(12) United States Patent
Boisvert et al.

(10) Patent No.: US 8,269,360 B2
(45) Date of Patent: Sep. 18, 2012

(54) ELECTRONIC CONTROL FOR A HYDRAULICALLY DRIVEN AUXILIARY POWER SOURCE

(75) Inventors: Mario P. Boisvert, Reed City, MI (US); Thomas Kienitz, Chase, MI (US); John M. Washeleski, Cadillac, MI (US); Andrew Blank, Cadillac, MI (US)

(73) Assignee: Uusi, LLC, Reed City, MI (US)

( * ) Notice: Subject to any disclaimer, the term of this patent is extended or adjusted under 35 U.S.C. 154(b) by 519 days.

(21) Appl. No.: 12/626,028

(22) Filed: Nov. 25, 2009

(65) Prior Publication Data
US 2010/0097040 A1    Apr. 22, 2010

Related U.S. Application Data

(63) Continuation-in-part of application No. 12/324,025, filed on Nov. 26, 2008, now Pat. No. 7,759,811, which is a continuation-in-part of application No. 11/275,574, filed on Jan. 17, 2006, now Pat. No. 7,459,800.

(51) Int. Cl.
*F03B 13/00* (2006.01)
*F03B 13/10* (2006.01)
*H02P 9/04* (2006.01)

(52) U.S. Cl. .......................................................... 290/43
(58) Field of Classification Search ................ 290/40 C, 290/29, 1 R, 40 B, 43, 40 R, 4 D
See application file for complete search history.

(56) References Cited

U.S. PATENT DOCUMENTS

| | | | |
|---|---|---|---|
| 3,660,975 A * | 5/1972 | Martin et al. ................... 60/447 |
| 3,941,016 A | 3/1976 | Will | |
| 4,287,429 A | 9/1981 | Bashnin et al. | |
| 4,754,156 A | 6/1988 | Shiozaki et al. | |
| 4,920,277 A | 4/1990 | Kuwabara et al. | |
| 5,028,221 A | 7/1991 | Malfit | |
| 5,410,943 A | 5/1995 | Kervagoret | |
| 5,421,705 A | 6/1995 | Benckert | |
| 6,394,206 B1 | 5/2002 | Fury | |
| 6,483,198 B2 | 11/2002 | Schmitz et al. | |
| 6,664,651 B1 | 12/2003 | Kotre et al. | |
| 6,677,685 B2 | 1/2004 | Pfleger et al. | |
| 6,781,350 B1 | 8/2004 | Iwatani et al. | |
| 7,053,498 B1 | 5/2006 | Boisvert et al. | |
| 7,268,442 B2 | 9/2007 | Syed et al. | |
| 7,285,869 B2 | 10/2007 | Syed et al. | |
| 7,459,800 B2 | 12/2008 | Boisvert et al. | |
| 2009/0134848 A1 | 5/2009 | Boisvert et al. | |

* cited by examiner

*Primary Examiner* — Javaid Nasri
(74) *Attorney, Agent, or Firm* — Brooks Kushman P.C.

(57) ABSTRACT

A hydraulic system includes a variable displacement hydraulic pump connectable to a power source, a hydraulic motor, a fluid circuit, a pump displacement control, and a controller. The pump has an inlet for receiving fluid, an outlet for discharging pressurized fluid, and a pump displacement input. The motor has an inlet for receiving pressurized fluid and an outlet for discharging spent fluid. The fluid circuit includes a supply conduit for conducting fluid discharged by the pump to the motor and a return conduit for returning fluid discharged by the motor to the pump. The pump displacement control cooperates with the pump displacement input to vary pump displacement. The controller communicates with the pump displacement control to control the pump output such that the motor is driven at a constant speed to thereby drive a generator connected to the motor at a constant speed despite speed fluctuations of the power source.

47 Claims, 12 Drawing Sheets

ELECTRONIC CONTROL FOR A HYDRAULICALLY DRIVEN AUXILIARY POWER SOURCE

CROSS-REFERENCE TO RELATED APPLICATIONS

This application is a continuation-in-part of U.S. application Ser. No. 12/324,025, filed Nov. 26, 2008; which is a continuation-in-part of U.S. application Ser. No. 11/275,574, filed Jan. 17, 2006, now U.S. Pat. No. 7,459,800.

This application is related to U.S. application Ser. No. 11/037,984, filed Jan. 18, 2005, now U.S. Pat. No. 7,053,498.

BACKGROUND OF THE INVENTION

1. Field of the Invention

The present invention is directed to an electronic control for hydraulic systems, and more particularly to precision control of hydraulically driven generators for stabilizing frequency and voltage output characteristics.

2. Background Art

Most engine driven vehicles utilize an internal combustion engine as the primary power source for propelling a vehicle. However, numerous modules and devices for the vehicle as well as the engine require electrical power. Typically, a rechargeable battery is provided with the vehicle as a basic power supply. The battery power supply system provides direct current (DC) electrical power for starting the vehicle engine and for operating certain DC compatible electrical loads when the vehicle is not running. The battery is recharged to maintain power by an alternator coupled to and driven by the engine when the vehicle is running. Concurrently, the alternator also provides DC electrical power to the vehicle electrical loads.

With the advent of electronics in today's modern vehicle, ground vehicles, boats and aircraft alike, the amount of electrical loads which require power has significantly increased. Moreover, many various auxiliary electrical loads are dependent upon stable alternating current (AC), for example, rescue and military vehicles having AC powered communications equipment. Additionally, many other vehicles, such as utility and telephone company repair and maintenance vehicles and vehicles providing electrical welding equipment, are increasingly utilizing AC equipment dependent upon clean AC power.

Various systems have been proposed for alleviating the complication of operating both AC and DC powered electrical equipment. One such system involves driving an auxiliary AC generator from the vehicle's engine or principal power plant. This can be accomplished by connecting the generator to a power take off or to any other suitable connection to engine output. While this will indeed operate a generator, variations in engine speed will wreak havoc with characteristics of power output and therefore with equipment which is dependent upon stable voltage and frequency characteristics of electrical power.

Accordingly, various systems have been proposed to control speed of an AC generator. One such system utilizes a hydraulic circuit having a valve for supplying a constant rate of fluid flow to a hydraulic motor. The hydraulic motor in turn drives a generator for supplying AC power to certain AC compatible electrical loads. However, such systems can have difficulty maintaining precise frequency output for controlling the most sensitive AC equipment and are often susceptible to premature mechanical failure.

SUMMARY OF THE INVENTION

Accordingly, it is an aspect of the present invention to provide a hydraulic control system for generating precise electrical output characteristics, particularly frequency and voltage output, along with prolonging the life of the system, thus reducing warranty returns and costs associated therewith.

A hydraulic control system for driving an auxiliary power source, located aboard a vehicle having a primary power source, at constant speed despite fluctuations in rotational speed of the primary power source is provided. The system may include a hydraulic pump, a hydraulic motor, a fluid circuit, a control valve assembly, and a control circuit. The control valve assembly may be proportional, and/or compensation or a combination of both. The pump may be drivably connectable to the primary power source and can have an inlet for receiving fluid for pumping and an outlet for discharging pumped fluid under pressure. The motor may be drivably connectable to the auxiliary power source and can have an inlet for receiving fluid under pressure and an outlet for discharging spent fluid. The fluid circuit may include a supply conduit for conducting fluid discharged by the pump to the motor, a return conduit for returning fluid discharged by the motor to the pump, and a bypass conduit for conducting fluid discharged by the pump directly to the return conduit, bypassing the motor, and returning fluid to the pump.

The motor may be drivably connected to any device that requires or prefers a constant or otherwise controlled rotational speed. The rotational devices may be connected to allow one hydraulic motor to drive multiple devices. Additionally, engagement and disengagement methods, such as clutches or hydraulic valves, may be used to control which of the multiple devices are in operation.

The control valve assembly can be disposed serially or parallel with respect to the supply conduit and interposed between the outlet of the pump and the inlet of the motor. The control valve assembly may have a housing including a valve chamber, a valve disposed within the valve chamber for apportioning the flow of fluid between the supply conduit and the bypass conduit, a solenoid drivably connectable to the valve for selectively moving the valve incrementally within the valve chamber between an opened position and a closed position. Moreover, a first fluid passage may be provided in fluid communication with the valve chamber and the supply conduit going to the motor, while a second fluid passage may be provided in fluid communication with the valve chamber and the bypass conduit. The valve can selectively close and open the first fluid passage and the second fluid passage proportionally dividing the flow of fluid therebetween.

The control circuit may be in electrical communication with the control valve assembly for controlling the control valve assembly and hence the fluid flow within the first fluid passage to the motor supply conduit and the second fluid passage to the bypass conduit. Further, the control circuit may include a sensor electrically coupled to the auxiliary power source for determining output frequency and/or voltage of the auxiliary power source. A reference signal generator for generating a reference signal indicative of a predetermined output frequency (and/or a predetermined output voltage) may also be provided. Additionally, the control circuit can include a comparing sub-circuit for comparing sensed output frequency (and/or sensed output voltage) with the reference signal, and for generating a control signal controlling the valve assembly such that the supply of fluid conducted to the supply conduit is sufficient to maintain desired output frequency (and/or desired output voltage).

Moreover, the control circuit of the hydraulic control system may further include a temperature sensor disposed in the fluid circuit for sensing hydraulic fluid temperature. A system controller having a fluid pre-heating sub-circuit may be provided for generating a control signal controlling the valve assembly such that fluid bypasses the motor entirely until safe fluid temperature is obtained. The system controller may further include a power ramping sub-circuit for generating a control signal controlling the valve assembly when sufficient fluid temperature is obtained such that power is supplied gradually to the motor.

Furthermore, the system controller may include an over-temperature shutdown sub-circuit for generating a control signal controlling the valve assembly when fluid temperature becomes too hot for safe operation such that fluid bypasses the motor, thereby shutting down the auxiliary power source. Additionally, the control circuit can be equipped with an emergency override accessible by an operator for instructing the system controller to continue system operation even though unsafe operating conditions exist that may damage the system.

It is another aspect of the present invention to provide a hydraulic control system that senses fluid pressure in the fluid circuit and automatically engages the auxiliary electrical system to power certain electrical loads, provided safe operating temperatures are obtained.

Accordingly, the control circuit of the hydraulic control system may further include a pressure sensor for determining sufficient hydraulic pressure for commencing system operation. The pressure sensor can cause system operation to begin when hydraulic pressure is sufficient, and can, correspondingly, cause system operation to shut down when hydraulic pressure is deficient.

In an alternative embodiment of the present invention, the valve assembly can be eliminated. Rather then bypassing the pump output about the motor, a variable displacement of the pump is utilized having a pump displacement input. The effect of displacement of the pump can be varied in order to achieve a desired hydraulic motor input flow or pressure automatically increasing pump displacement when the flow or pressure drops and then decreasing pump displacement when the hydraulic motor input flow or pressure exceeds a specified level.

In a particular construction of the present invention, the motor, the associated auxiliary power source and much of the control circuit is located in a module suitable for being located on the exterior of a vehicle.

Yet another aspect of the present invention is to control operation of the hydraulic circuit to perform under safe operating conditions.

Therefore, a method, according to the present invention, for operating a hydraulic control system may include sensing hydraulic fluid temperature in a fluid circuit, warming hydraulic fluid by circulating the fluid through portions of the fluid circuit bypassing a hydraulic motor, if sensed fluid temperature is below safe operating temperature, and supplying the fluid slowly through to the motor once the fluid reaches safe operating temperature to gradually bring the motor up to desired speed so that full power operation can commence.

Warming the fluid may involve maintaining open an electronically controlled hydraulic valve disposed within the fluid circuit such that fluid is directed entirely to a bypass conduit. Supplying fluid slowly to the motor may involve gradually closing an electronically controlled hydraulic valve disposed within the fluid circuit such that fluid is gradually conducted through a motor supply conduit in fluid communication with the motor in order to gradually apply power to the motor.

Moreover, the method for operating the hydraulic control system may further include sensing hydraulic motor output characteristics and apportioning fluid flow to the hydraulic motor in order to maintain constant motor output characteristics. Sensing hydraulic motor output characteristics may involve sensing electrical output characteristics of a generator driven by the motor. Apportioning may involve comparing sensed output characteristics with predetermined output characteristics, generating a control signal based on the comparison, and selectively controlling an electronically controlled hydraulic valve to move incrementally within a valve chamber such that fluid is proportionally divided between a motor supply conduit in fluid communication with the motor and a bypass conduit, which bypasses the motor.

Further, the method of operating the hydraulic control system may include preventing over-temperature damage to the system when the sensed fluid temperature exceeds safe operating temperature. Preventing over-temperature damage may involve annunciating the existence of over-temperature conditions to an operator when a first high temperature is obtained, triggering a timer to begin counting down a specified time when a second high temperature is obtained, and bypassing all fluid flow to the motor when the timer has expired. Bypassing all fluid flow to the motor can involve opening an electronically controlled hydraulic valve disposed within the fluid circuit such that fluid is directed entirely to a bypass conduit. Additionally, the method may include overriding the bypassing step upon receipt of an emergency override instruction from an operator to prevent shutdown and keep the system operating.

Furthermore, the method of operating the hydraulic control system may also include sensing fluid pressure in the fluid circuit, commencing operation of an auxiliary power source if sensed fluid pressure is sufficient by controlling a hydraulic valve to meter fluid to the hydraulic motor, which drives the auxiliary power source, and ceasing operation of the auxiliary power source if sensed fluid pressure is deficient by fully opening the valve to bypass all fluid flow to the motor.

Still another aspect of the present invention is to provide annunciation of auxiliary power source output characteristics.

Still yet a further aspect of the present invention is that acceleration of the auxiliary power source from the stopped condition, as well as cold temperature condition, be gradual.

These and other aspects, objects, features, and advantages of the present invention will become more clearly understood and appreciated from a review of the following detailed description of the preferred embodiments and appended claims, and by reference to the accompanying drawings.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
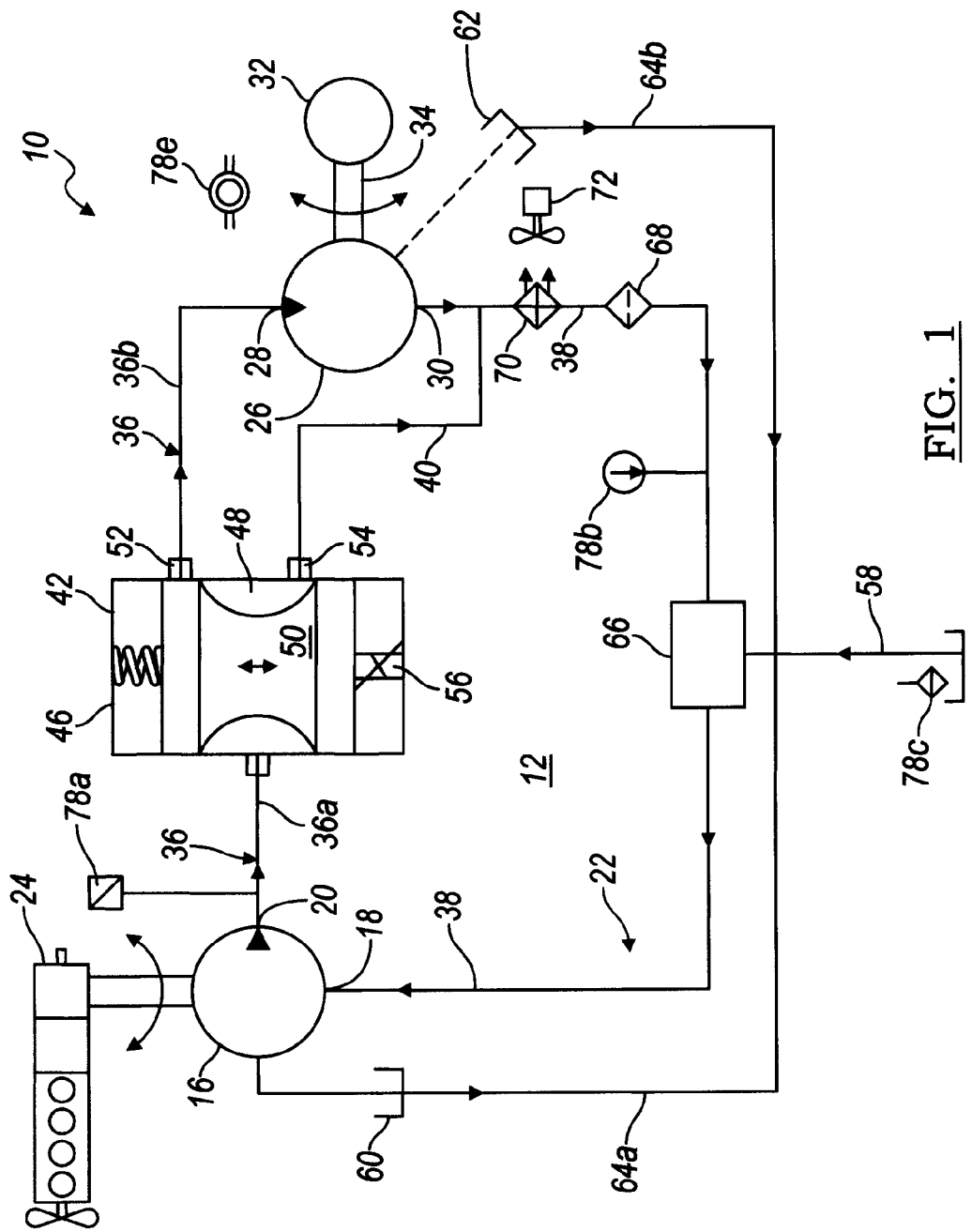
FIG. 1 is a schematic diagram of a hydraulic circuit exhibited in an exemplary control system according to an aspect of the present invention.
Figure 2:
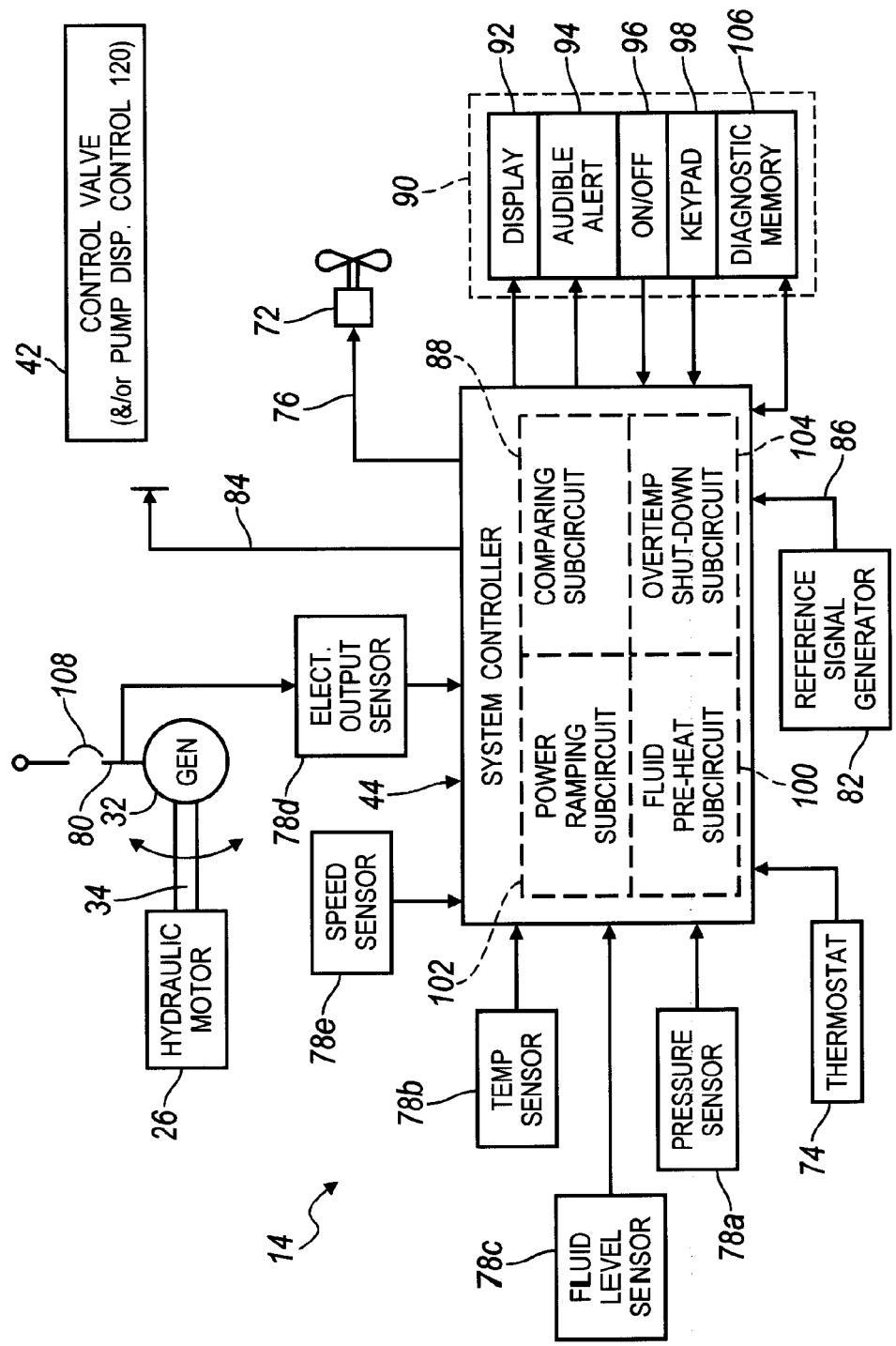
FIG. 2 is a schematic diagram of an alternate hydraulic circuit exhibited in an exemplary control system according to an aspect of the present invention.

A hydraulic control system 10, according to an aspect of the present invention, is illustrated in FIGS. 1 and 2. FIG. 1 generally depicts a hydraulic circuit 12 for hydraulic control system 10, while FIG. 2 generally depicts a control circuit 14 for system 10.

Referring to FIG. 1, hydraulic circuit 12 of system 10 is powered by a hydraulic pump 16, having an inlet 18 for receiving fluid for pumping and an outlet 20 for discharging pumped fluid under pressure. Pump 16 can be a variable displacement type pump, a fixed displacement type pump, or the like, for pumping pressurized fluid throughout a fluid circuit 22. Pump 16 can be driven by a primary power source 24, such as a vehicle power take-off (PTO), belt drive, gasoline engine, diesel engine, or any similar input. Pump 16 can include a thru-drive so that an additional hydraulic pump or other auxiliary power device can be implemented mechanically in series with pump 16. A hydraulic motor 26, having an inlet 28 for receiving fluid under pressure and an outlet 30 for discharging spent fluid, can be disposed within hydraulic circuit 12, as shown. Motor 26 drives an auxiliary power source 32, which provides electrical or mechanical power to vehicle loads or devices (not shown). For example, auxiliary power source 32 can be an AC generator, a mechanical drive system, or other source requiring constant rotational speed. Additionally, an electronic inverter or converter (not shown) can be added to the output of auxiliary power source 32 to create a secondary power output type or to create two or more output types simultaneously. Motor 26 can be drivably connected to auxiliary power source 32 through a shaft 34 (as shown in FIGS. 1 and 2), or a belt or other means of power transmission (not illustrated). Moreover, motor 26 can be a fixed displacement gear type motor, vane type motor, piston type motor, or the like.

System 10 may contain a switch or multiple switches to select the electrical output. The switch or switches may be mechanically or electrically actuated and be capable of selecting various voltages, frequencies, or power types such as AC to DC.

Fluid circuit 22 can include a supply conduit 36, a return conduit 38, and a bypass conduit 40. Conduits 36, 38, and 40 can utilize quick disconnect hydraulic fittings to aid in quick installation or removal of any applicable component. Supply conduit 36 can be divided into at least two sections—a valve supply conduit 36a and a motor supply conduit 36b. Supply conduit 36 conducts fluid discharged by pump 16 to motor 26, while return conduit 38 returns fluid discharged by motor 26 to pump 16. Bypass conduit 40, meanwhile, can be disposed in fluid circuit 22 to conduct fluid discharged by pump 16 directly to return conduit 38, bypassing motor 26, where the fluid is subsequently returned to pump 16.

System 10 preferably includes a control valve assembly 42, such as an electro-hydraulic control valve assembly, controlled by a system controller 44 (shown in FIG. 2). Control valve assembly 42 can be disposed serially and/or parallel with respect to supply conduit 36 such that valve assembly 42 is interposed between outlet 20 of pump 16 and inlet 28 of motor 26. Control valve assembly 42 may include a housing 46 generally enclosing a valve chamber 48. A valve 50, which shuttles back and forth between an opened position and a closed position, may be disposed within valve chamber 48. Control valve assembly 42 may further include a first fluid passage 52 and a second fluid passage 54. Further, control valve assembly 42 can be disposed within hydraulic circuit 12 such that first fluid passage 52 is in fluid communication with valve chamber 48 and motor supply conduit 36b, while second fluid passage 54 is in fluid communication with valve chamber 48 and bypass conduit 40. A solenoid 56 or other electronic or electro-mechanical device can be drivably connected to valve 50 for selectively moving valve 50 incrementally within valve chamber 48 between the opened and closed positions. Solenoid 56 can be in electrical communication with system controller 44, which drives solenoid 56. Accordingly, system controller 44 can communicate with control valve assembly 42 such that valve 50 selectively closes and opens first fluid passage 52 and second fluid passage 54, thereby dividing fluid flow proportionally therebetween.

As valve 50 divides the flow of hydraulic fluid between first fluid passage 52 and second fluid passage 54, the fluid can be correspondingly directed to motor supply conduit 36b and bypass conduit 40, respectively. Fluid directed to motor supply conduit 36b may be supplied to, and discharged by, motor 26 for powering auxiliary power source 32 before returning to pump 16 via return conduit 38. Fluid directed to bypass conduit 40 can bypass motor 26 completely as it is steered immediately to return conduit 38, without being supplied to motor 26, for restoring to pump 16.

Figure 3:
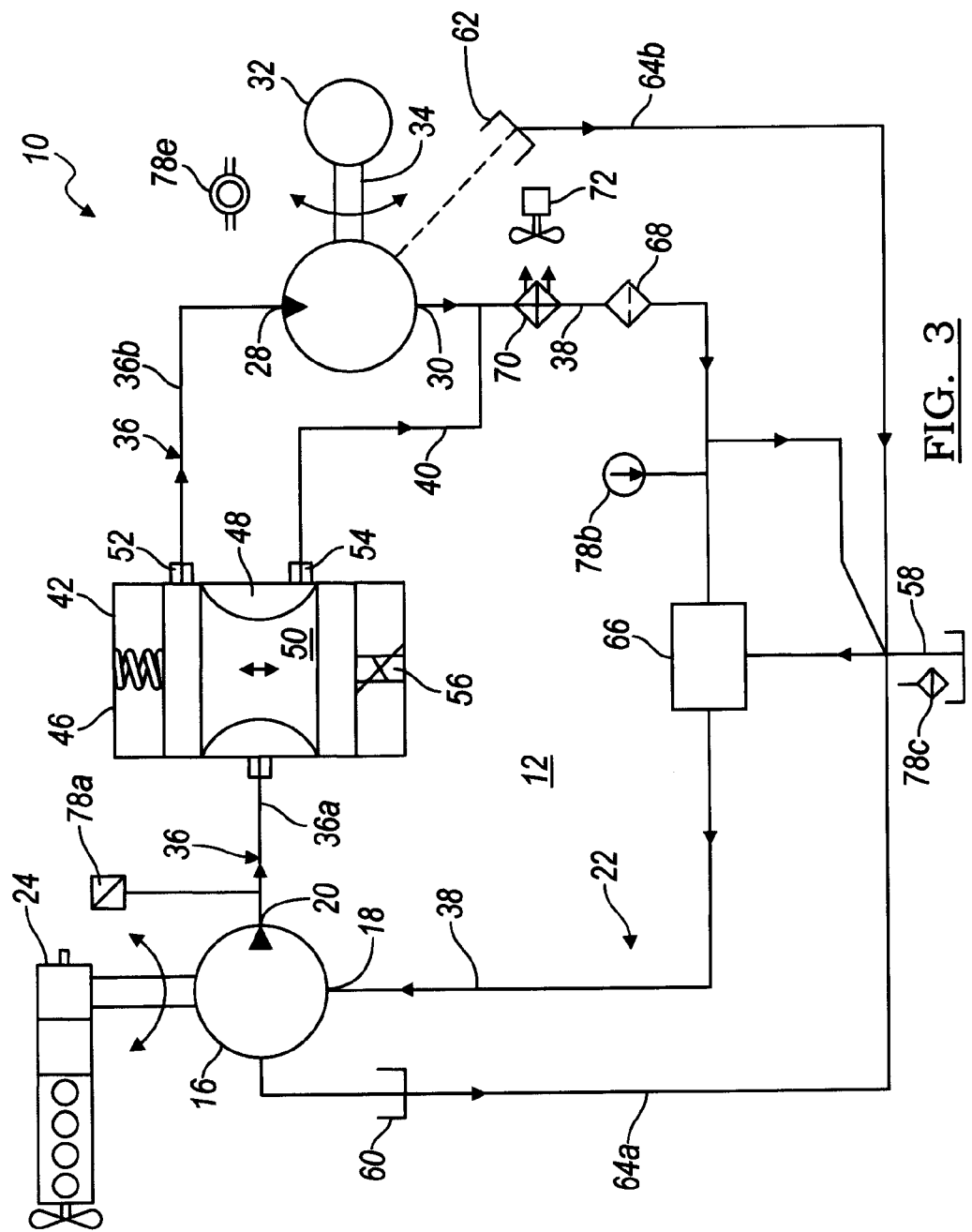
FIG. 3 is a schematic diagram of a second alternative embodiment of a hydraulically driven generator and the associated control circuit in accordance with another aspect of the present invention.

Optionally, hydraulic circuit 12 may include a fluid reservoir 58 and a pump case drain 60 disposed at pump 16, a motor case drain 62 disposed at motor 26, or both. Drains 60 and 62 can utilize quick disconnect hydraulic fittings to aid in quick installation or removal of any applicable component. Fluid reservoir 58 can be in fluid communication with fluid circuit 22 and maintains hydraulic fluid on reserve that can be introduced to pump 16 via return conduit 38. In an embodiment of the present invention, possible case drain flow from pump 16 and motor 26 can be directed back to fluid reservoir 58 through drain conduits 64a-b (as illustrated in FIG. 3). Fluid flow in return conduit 38 can be directed through a venturi boost 66, where fluid from fluid reservoir 58 may be drawn into return conduit 38 to replace that lost from the case drain flow, and supplied back to pump 16. Alternatively, a secondary pump or charge pump (not shown) can be used where fluid from fluid reservoir 58 may be pumped to return conduit 38 to replace that lost from the case drain flow and supplied back to pump 16. The preferred secondary pump drive is via a thru-drive operation on pump 16 but alternately the secondary pump could be driven by any auxiliary power source. Finally, drain conduits 64a-b can be disposed in fluid circuit 22 such that case drain flow can be pulled directly to return conduit 38 by venturi boost 66, without first being directed to fluid reservoir 58 (as shown in FIG. 1).

Additionally, hydraulic circuit 12 may also include a fluid filter 68 and a fluid cooler 70. Fluid filter 68 and fluid cooler 70 are preferably disposed serially and/or parallel with respect to return conduit 38. However, it is to be understood that fluid filter 68 and fluid cooler 70 can be disposed anywhere within fluid circuit 22 without departing from the scope of the present invention. Impurities introduced into the hydraulic fluid as it gets cycled through fluid circuit 22 can be filtered by fluid filter 68. Fluid cooler 70, on the other hand, can cool fluid that passes there through. Accordingly, fluid cooler 70 may include a heat exchanger (not separately shown) for dissipating heat to ambient air, an electrically or hydraulically operated fan 72 disposed adjacent the heat exchanger for forcing ambient air through the heat exchanger, and a thermostat 74 (not separately shown in FIG. 1) which controls fan operation when fluid contained within fluid cooler 70 exceeds a predetermined temperature. Thermostat 74 can directly control fan 72, or, alternatively, thermostat 74 can control fan operation through system controller 44. For example, thermostat 74 and fan 72 may be in electrical communication with system controller 44. System controller 44 may receive temperature readings of the fluid in fluid cooler 70 from thermostat 74. Correspondingly, system controller 44 can operate fan 72 by transmitting a fan control signal 76 to fan 72 when fluid contained within fluid cooler 70 exceeds the predetermined temperature.

System 10, according to an aspect of the present invention, may also include a pressure sensor 78a, a temperature sensor 78b, a fluid level sensor 78c, an electrical output 78d (FIG. 2 only), a speed sensor 78e, and an air temperature sensor (not shown), collectively referred to as system control sensors 78. Each control sensor 78 can be provided as part of control circuit 14, shown in FIG. 2, and are configured to provide control inputs to system controller 44. Control sensors 78 can be deployed throughout system 10 to measure system vitals and assure auxiliary power source 32 is driven at constant speeds.

Referring back to FIG. 1, pressure sensor 78a can be disposed along valve supply conduit 36a proximate pump 16 to sense hydraulic pressure. However, it is to be understood that there are many other locations in fluid circuit 22 for positioning pressure sensor 78a so long as it can accurately sense that pump 16 is operating. Similarly, temperature sensor 78b can be disposed along fluid circuit 22 to monitor hydraulic fluid temperature. Temperature sensor 78b can be separate from thermostat 74 and thus provide separate input to system controller 44, or, alternatively, the temperature sensor can be the same as the thermostat. Fluid level sensor 78c can be disposed within fluid reservoir 58 to monitor the level of hydraulic fluid within reservoir 58. If the fluid level becomes low, system controller 44 may announce a tell-tale alarm to the operator. If the fluid level becomes extremely low, system controller 44 may cause system 10 to shut down entirely to prevent damage to pump 16. The temperature sensor can be disposed in close proximity to auxiliary power source 32.

In an embodiment of the present invention, auxiliary power source 32 can be an AC generator. Accordingly, electrical output 78d can be a current sensor, voltage sensor, or both for monitoring the generator's operating characteristics, including current, voltage, and frequency. Electrical output 78d can be connected to output conductors 80 of generator 32 to sense the generator operating parameters. Alternatively, speed sensor 78d may be provided to monitor rotational speed of motor 26 and shaft 34, by sensing each revolution of shaft 34, in order to provide controlled input to system controller 44 relating to operation of motor 26.

Additional embodiments of the present invention can consist of auxiliary power source 32 being any device that requires or prefers a constant RPM. These alternate devices can be connected serially to provide a constant RPM for multiple devices or individually. A clutch or other connection/disconnection method may be used to actuate or deactivate a particular device. As well, hydraulic valving could allow the use of multiple devices with independent control. Alternate devices can include, but are not limited to, such items as hydraulic pumps such as for extraction tools, air pumps such as for filling breathing apparatus tanks, and foam pumps such as for pressurized the suppression foaming equipment.

Referring now to FIG. 2, control circuit 14 will be described in further detail with reference to an AC generator as driven auxiliary power source 32, although other applications referred to in the detailed description are also possible. As previously described, control circuit 14 may include system controller 44 and one or more of control sensors 78, as well as a reference signal generator 82. System controller 44 can be a programmable controller having a microprocessor (not separately shown) that implements control algorithms for the control of the generator output, namely voltage and frequency. System controller 44 controls the generator output by applying a control output signal 84 to control valve assembly 42, directing valve assembly 42 to meter fluid, and hence power, to motor 26 for driving the generator. System controller 44 varies the power supplied to motor 26 through the use of control output signal 84. Accordingly, control output signal 84 can be a pulse-width modulated voltage waveform or a variable DC output voltage applied to solenoid 56 of valve assembly 42.

Vehicles today often rely on sensitive and delicate electronics equipment, wherein only the cleanest of power is acceptable for operation. Very little variance in the output frequency of an AC generator is tolerable in order to operate various devices such as computers and communications equipment. Merely close frequency output in relation to desired frequency output is not good enough. Accordingly, it may be desirable to compare actual frequency with a predetermined frequency, rather than merely relying on sensed motor speed as an indirect method of determining the generator's output characteristics. Of course, it is to be understood that sensing rotational speed of motor 26 may be adequate in certain applications. Nonetheless, in an embodiment of the present invention, electrical output 78d can be electrically coupled to generator 32. Reference signal generator 82 can be in electrical communication with system controller 44 and generates a reference signal 86 indicative of the predetermined output frequency. System controller 44 may include a comparing sub-circuit 88 that implements control algorithms for comparing sensed output frequency with reference signal 86. Comparing sub-circuit 88 can then generate and transmit control output signals for controlling valve assembly 42 such that the supply of fluid conducted to motor 26 is sufficient to maintain desired generator output frequency.

Similarly, electrical devices often have very precise voltage requirements wherein only the tightest voltage regulation is acceptable. Therefore, it may be advantageous for system controller 44 to be in electrical communication with a generator voltage regulator. System controller 44 can monitor the electrical output via electric output sensor 78d and make adjustments using the generator voltage regulator resulting in very tightly controlled voltage. Additionally, system controller 44 can anticipate and adjust the generator voltage regulator to promote system stability, especially during load variations, such as adjusting voltage to eliminate system oscillation.

System controller 44, constructed in accordance with an exemplary embodiment of the present invention, may also implement additional control algorithms for the electrical or mechanical system's output functions in response to load variations, physical changes in the electrical or mechanical system's operating environment or equipment, and communications from the user or other electronic modules. As the load on the electrical or mechanical system is increased or decreased, or the hydraulic fluid viscosity changes due to temperature fluctuations and such, or the operating characteristics of pump 16, motor 26, or valve assembly 42 change due to ambient conditions or wear, system controller 44 can further adjust outputs to maintain consistent operation of the electrical or mechanical system.

Control circuit 14 may further include an operator interface module 90 enabling an operator of system 10 to communicate with system controller 44 through a bi-directional asynchronous serial communications interface. Interface module 90 can display system operating parameters through an information display 92. As non-limiting examples, the operating parameters displayed may include output voltage, frequency, current, hydraulic fluid temperature, total operating hours, and the like. Interface module 90 can also display or announce alarm conditions or faults detected by system controller 44 and permit the operator to interact with system controller 44 and influence the operation of auxiliary power source 32. The alarm conditions can be announced by an audible alert 94 included in interface module 90. The operator may also influence the configuration of system controller 44. For example, the operator may turn hydraulically powered system 10 on or off through an ON/OFF switch 96. Moreover, the operator may configure system controller 44 to automatically turn auxiliary power source 32 on when sufficient hydraulic pressure is detected. Further, the operator can instruct system controller 44 to purge air from the hydraulic lines, and configure the maximum expected output values to be controlled by the system. The operator communicates with system controller 44 through a keypad 98 disposed in interface module 90. Furthermore, multiple interface modules may be linked together to add multiple operator interfaces if desired.

When the electrical or mechanical system to be driven is idle or shut down, valve 50 can be normally fully open, directing all fluid flow into bypass conduit 40, and depriving motor 26 of power. At the operator's request through interface module 90, power can be metered to motor 26 by incrementally closing valve 50, which begins diverting some amount of fluid flow to motor 26. The more valve 50 is closed, the more power can be provided to motor 26, thereby activating the electrical or mechanical system.

Alternatively, the application of hydraulic pressure to fluid circuit 22 may be interpreted by system controller 44 as a command to commence electrical or mechanical system operation. The operator may wish to configure system controller 44 to automatically power auxiliary power source 32 when pump 16 is operating. If pressure sufficient for system operation is detected by pressure sensor 78a, system operation can automatically commence without further instruction from the operator. On the other hand, if the hydraulic pressure falls below that required for system operation, system controller 44 can direct valve 50 to open fully, diverting all fluid flow into bypass conduit 40, thereby shutting down motor operation.

System controller 44 may further include a fluid pre-heating sub-circuit 100. If temperature sensor 78b detects that hydraulic fluid in system 10 is too cold for normal operation, system controller 44 can implement fluid pre-heating sub-circuit 100 to warm the fluid to a safe operating temperature. Fluid pre-heating sub-circuit 100 can generate control output signals for controlling valve assembly 42 such that fluid bypasses motor 26 entirely until safe fluid operating temperature is obtained, avoiding damage to the mechanical components. System controller 44 can hold valve 50 fully open to circulate the hydraulic fluid through bypass conduit 40. Normal mechanical friction will warm the fluid until it reaches a first predetermined temperature, at which point valve 50 can be opened only enough to pass the warming fluid slowly through motor 26. Normal mechanical friction will warm the fluid further until it reaches a second predetermined temperature, at which point full power operation can commence.

Further, if temperature sensor 78b detects the hydraulic fluid is too cold for any operation, system controller 44 can implement an auxiliary heater 131 (see FIG. 12) disposed within hydraulic circuit 12 in front of inlet 18 of pump 16. Auxiliary heater 131 can have any number of power sources, AC power, DC power, diesel power, or propane power. It is understood that multiple sources of energy are possible to preheat the hydraulic fluid.

The application of fluid pre-heating sub-circuit 100 can be incredibly advantageous in extremely low temperatures where the hydraulic fluid can partially congeal. If fluid were permitted to pass through motor 26 immediately, prior to frictional warming through bypass conduit 40, lumps of congealed fluid can momentarily obstruct the motor gears causing motor 26 to briefly decelerate and then accelerate. The deceleration and acceleration caused by lumps in the fluid passing through the motor gears occurs almost instantaneously, resulting in large voltage spikes at the output of auxiliary power source 32 (in the case of a generator). The duration of the voltage spike is very abrupt and the magnitude of the voltage spike can be sufficient to damage various electrical loads. Fluid pre-heat sub-circuit 100 substantially minimizes this occurrence reducing warranty claims and the costs associated with, while greatly increasing customer satisfaction and good will.

Once pressure and temperature are sufficient, full system operation can begin. In order to bring system 10 up to power, system controller 44 may utilize a power ramping sub-circuit 102. Power ramping sub-circuit 102 can enable system controller 44 to slowly close valve 50 so as to gradually apply power to motor 26. This gradual application of power allows system 10 to gently overcome inertial effects, greatly reducing wear and increasing system component lifetimes.

Figure 4:
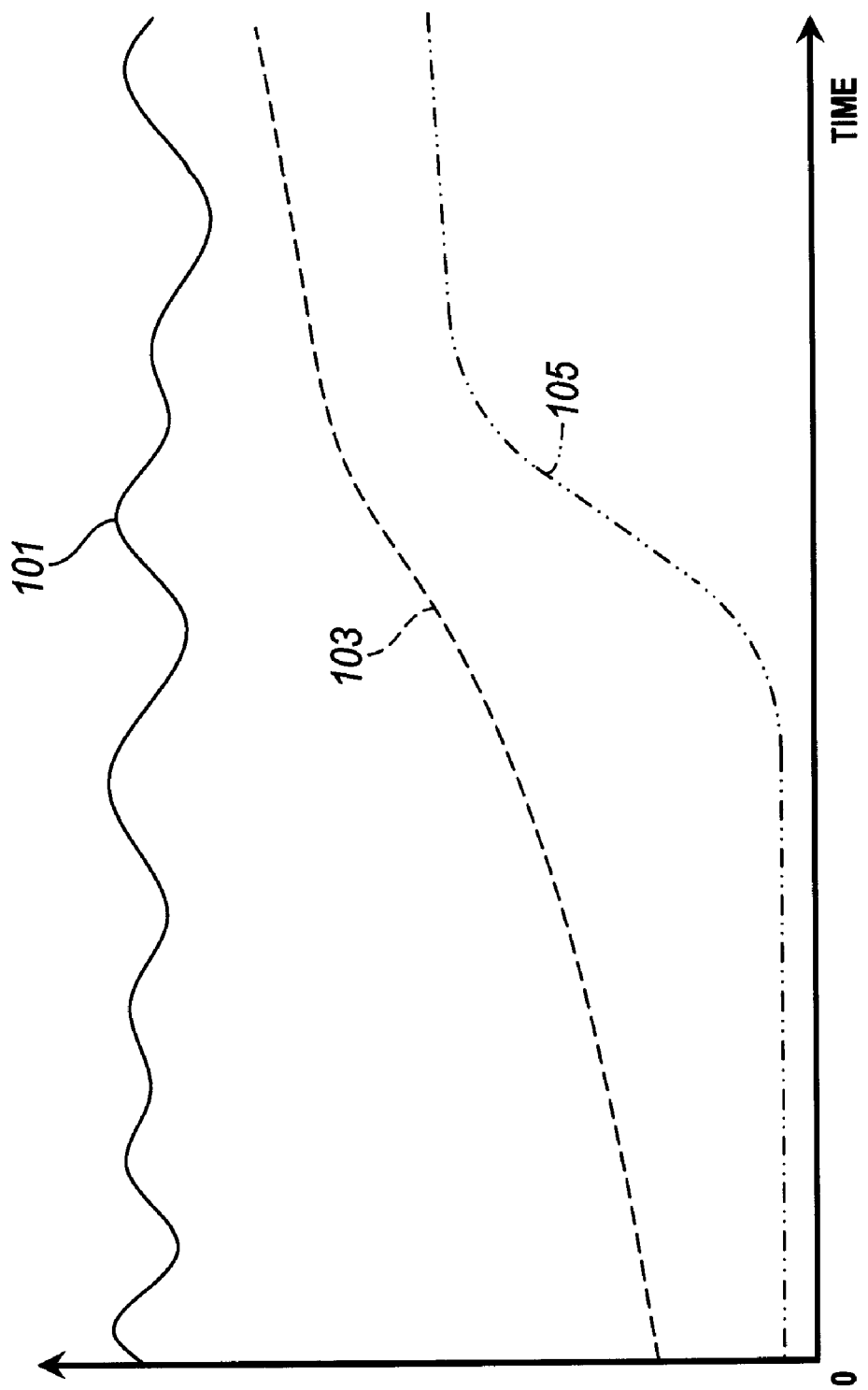
FIG. 4 is a graph generally displaying system characteristics during cold start operation according to an aspect of the present invention.

With reference now to FIG. 4, a graphical representation of cold start operation parameters of system 10, utilizing the fluid pre-heating sub-circuit 100 and the power ramping sub-circuit 102, is illustrated. Pump speed 101 generally depicts revolutions per minute (RPMs) of pump 16 over time at initial system cold temperature start-up. Pump speed 101 can fluctuate over time as the vehicle engine speed fluctuates. Fluid temperature 103 generally depicts temperature of the fluid in fluid circuit 22 during cold start operation. At cold start, hydraulic fluid can bypass motor 26 until it warms to a sufficient temperature, at which point fluid is slowly diverted to motor 26 to gradually supply power to the system. Also at cold start, hydraulic fluid can bypass fluid cooler 70 by the use of an electronically controlled valve or a mechanical pressure relief valve until the fluid warms to a temperature requiring cooling, at which point fluid flow gradually resumes proportional to fluid temperature through fluid cooler 70. Further, during cold start operation, hydraulic fluid flow can be entirely blocked by the closure of valve 50, wherein fluid temperature can rise within pump 16 until a sufficient temperature is reached, at which point fluid flow can resume proportional to fluid temperature by the gradual opening of valve 50. During this ramp-up, fluid temperature 103 can increase further permitting full system operation to begin. Motor speed 105 generally depicts operation of motor 26 (in RPMs) during cold start. Motor 26 can get little or no power, while the fluid warms as it circulates through bypass conduit 40. Once a desired temperature is obtained, motor speed 105 slowly ramps up as fluid is gradually supplied to motor 26. Once full system operation commences, motor speed 105 remains substantially constant, despite fluctuations in engine speed and hence pump speed 101.

Further, system controller 44 may include an overtemperature shut-down sub-circuit. When the temperature of the hydraulic fluid exceeds safe operating conditions, overtemperature shut-down sub-circuit 104 can notify the operator of the electrical or mechanical system that excessive temperatures are being detected, and action may be required to prevent damage to system 10. When the temperature exceeds yet another temperature threshold, overtemperature shut-down sub-circuit 104 can start an internal timer. If the timer expires, valve 50 may be fully opened by overtemperature shut-down sub-circuit 104, bypassing all fluid flow and shutting down system 10 unless the operator issues an emergency override instruction through keypad 98 to prevent the shutdown and keep the electrical or mechanical system operating.

Further, system controller 44 may include a sub-circuit to control a fan in proximity with auxiliary power source 32 to cool auxiliary power source 32. Auxiliary power source 32 may also be cooled by a suitable liquid cooled by an external fluid cooler.

Further, system 10 may include an air filter to protect key components, primarily auxiliary power source 32, from foreign contaminants. A sensor associated with the air filter to determine when the air filter is clogged or otherwise needs replacing may be electrically coupled to system controller 44.

System controller 44 may further include a means of enabling or disabling primary power source 24 such as disabling the power take off (PTO) via a primary power source control. System controller 44 may be configured to disable primary power source 24 to prevent damage to system 10 such as when the system operating temperature exceeds a predetermined limit. Alternatively, system controller 44 may be configured to not allow primary power source 24 to be enabled when conditions are such that damage to system 10 or an operator could occur.

System controller 44 may also have the ability to record all abnormal conditions and faults to a diagnostic memory 106. The faults can be retrieved from diagnostic memory 106 by an operator and displayed by interface module 90 to evaluate the conditions seen by system 10 and assist in any necessary troubleshooting. Recorded conditions may include, but are not limited to, valve voltage faults, valve current faults, over current faults, current sensing faults, temperature sensing faults, ground faults, number of over temperature overrides, fan faults, voltage sensing faults, hours run with over temperature, highest recorded frequency, highest recorded voltage, highest measured current, highest measured temperature, hours run with overcurrent, hours on oil filter, calibration values, maximum current values, and total hours.

Yet another advantage of hydraulic control system 10 is that it can be a self-contained system that can also be readily retrofit to a vehicle having a power take of, engine driven belt drive, or any other power supply source. Moreover, system 10 may include a circuit breaker 108 as yet another protective feature. Circuit breaker 108 may be located in series with output conductors 80 connected to output terminals of generator 32. Circuit breaker 108 can operate conventionally by opening an external circuit (not shown), which is connected to conductors 80 to conduct electrical power to powered equipment.

Circuit breaker 108 may be remotely tripable. System controller 44 or a standalone electronic sub-circuit (not shown) may be used to monitor the generator output current and determine if circuit breaker 108 should be tripped. Custom tripping profiles may be created to meet application specific requirements. Alternately, electrically controlled contacts (not shown) controlled by system controller 44 or a standalone electronic sub-circuit may be substituted for circuit breaker 108. As another safety feature, sensors can be added to system 10 allowing system controller 44 to detect if a cover or door, which is to protect a user from high voltages, is opened. In turn, auxiliary power source 32 can be disabled by opening circuit breaker 108 or opening the electrically controlled contacts.

System 10 can contain an electrical sub-circuit to shut down user prioritized loads dependent upon system conditions such as overheating and resources such as inadequate source power. System 10 can then communicate to a user the ability to return loads to power as the system conditions allow.

System 10 can have a means of troubleshooting wherein system controller 44 contains an electrical sub-circuit containing the ability to manually control valve assembly 42 and/or cooling fan 72.

A general overview of the operation of the hydraulic system electronic control, according to a certain embodiment of the present invention, is provided below. System controller 44 can sense adequate operating pressure in fluid circuit 22. If system controller 44 does not automatically interpret sufficient pressure as a command to commence operation, it can wait to receive a command signal from an input, operator, or other electronic module to activate the hydraulically powered mechanical or electrical system. System controller 44 can then check the status and values of the control inputs to ensure operation will be safe and effective. If the hydraulic fluid temperature is too low, fluid pre-heat sub-circuit 100 can cause the fluid to warm to safe operating temperatures. System controller 44 can then gradually apply power to motor 26 by slowly closing valve 50, according to power ramping sub-circuit 102. Appropriate control signals can be applied by system controller 44 to outputs in response to the control inputs to achieve the desired control and function of system 10. If the hydraulic fluid temperature becomes too high for safe operation, overtemperature shut-down sub-circuit 104 can be implemented to shut down the operation of the electrical or mechanical system. The system's operating parameters may be sent via serial communications using a proprietary protocol to operator interface module 90 or other electronic module. Alternatively, the system's operating parameters may be sent via a standard communication protocol to the vehicle data bus. Further, operator interface module 90 can communicate with system controller 44 using the vehicle data bus. If a command is received from an operator or other electronic module to cease operation, or the hydraulic pressure falls below that required for operation, system controller 44 can shut down the electrical or mechanical system by fully opening valve 50, bypassing all hydraulic fluid flow to motor 26.

Figure 5:
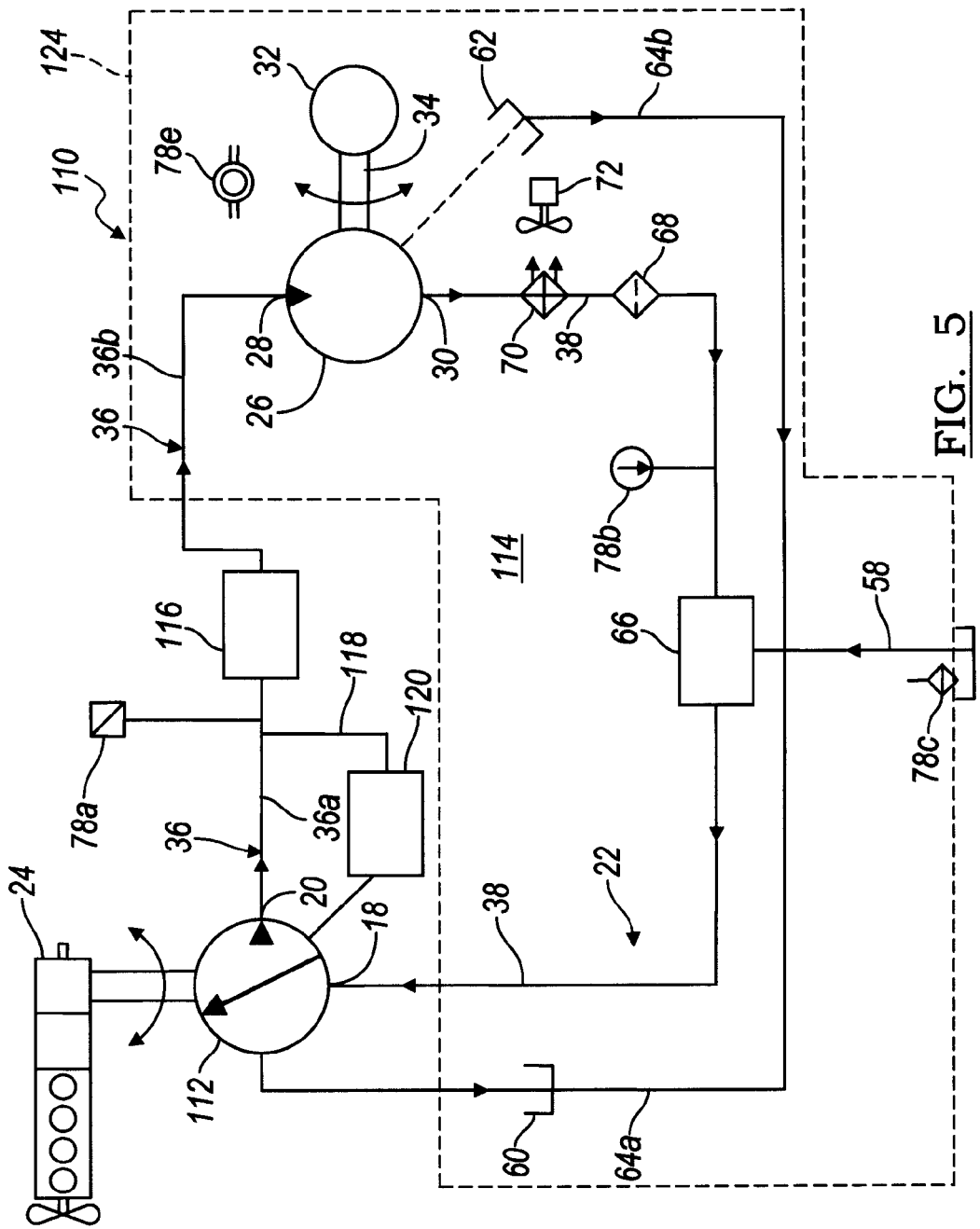
FIG. 5 is a schematic diagram of a third alternative embodiment of a hydraulically driven generator and the associated control circuit in accordance with another aspect of the present invention.

A third embodiment of the present invention is illustrated in FIG. 5. A hydraulically driven generator system 110 is similar to system 10 described with reference to FIG. 1, however rather than using a control valve assembly 42 to regulate the amount of the output of pump 16 that passes through motor 26, a variable displacement pump 112 is utilized which has an external input which enables the control system to vary the pump displacement to achieve the desired flow rate needed for motor 36. Hydraulic control circuit 114 of the FIG. 5 embodiment is otherwise generally similar to control circuit 12 utilized in the FIG. 1 embodiment and like components function in a similar manner as described previously.

In operation the output from pump 112 provides hydraulic fluid to motor 26. As previously described, control valve 42 is utilized in the FIG. 1 embodiment is no longer required provided the pump minimum displacement is sufficiently low. If the minimum pump displacement is substantial, i.e., over 20% of maximum pump displacement, a control valve 42 as previously described can be added in order to deactivate motor 26 at desired times. When control valve 42 is not used an optional pressure regulator 116 can be provided to maintain desired minimum back pressure on the outlet of pump 112 which is sufficient to operate pump displacement control 120 which is supplied with hydraulic fluid via line 118.

A pump displacement control 120 cooperates with pump 112 to vary the displacement of pump 112 as needed. Pump displacement control 120 can have a hydraulic output or alternatively a mechanical output as dictated by the pump design. Pump displacement control 120 varies the pump displacement as a function of a control signal 84 received from system controller 44 illustrated in FIG. 2. Pump displacement control 120 is hydraulically powered, alternatively an electrically operated actuator such as a stepper motor could be used to vary pump displacement. Hydraulically driven generator system 110 of the FIG. 5 embodiment is designed to have reduced pumping losses and associated energy consumption when compared to system 10 of FIG. 1 in which high pressure fluid is routinely bypassed about motor 26 at high pump speed conditions.

Figure 6:
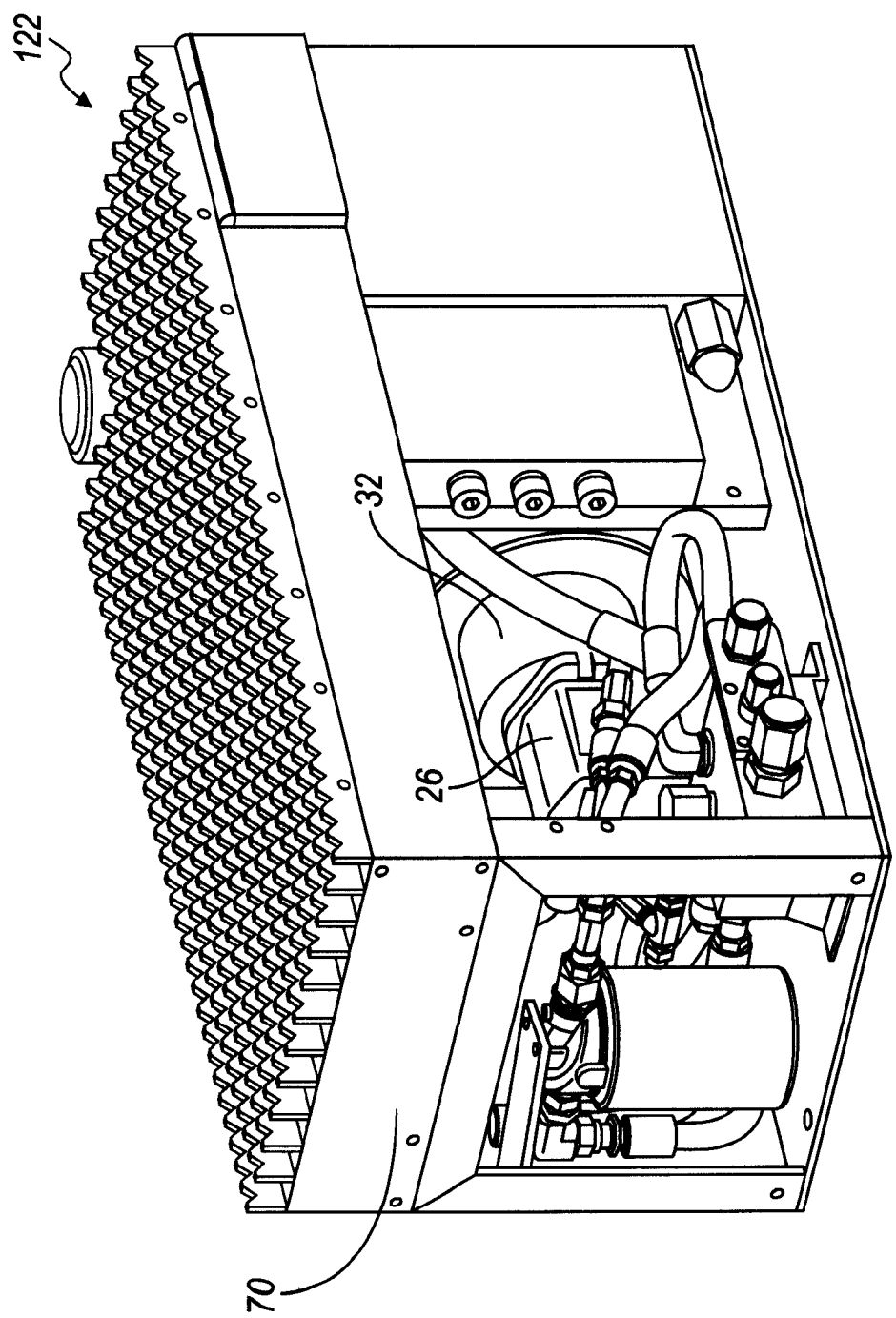
FIG. 6 is an illustration of an auxiliary module unit suitable for mounting a hydraulic driven generator of the present invention to the exterior of a vehicle.
Figure 8:
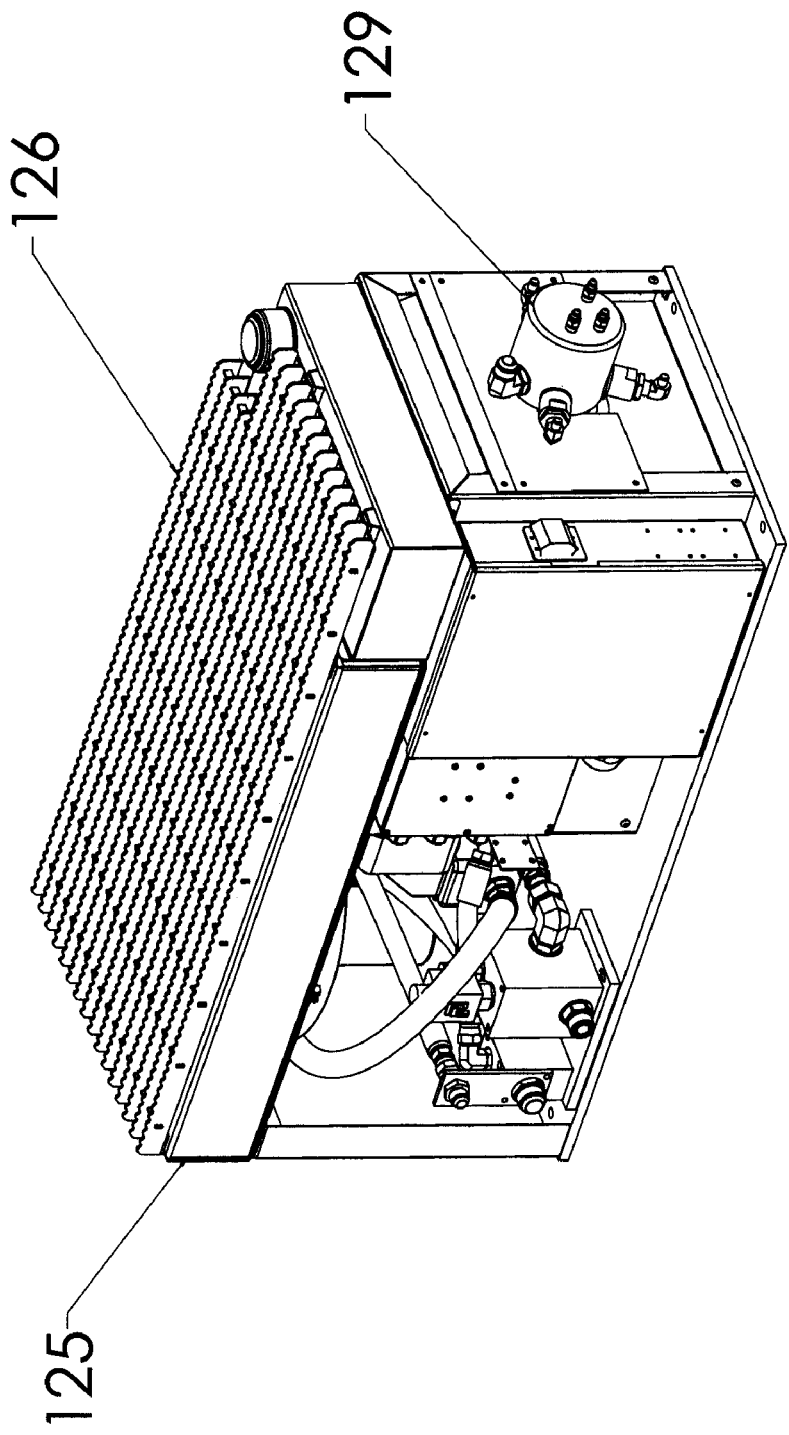
FIG. 8 is another illustration of the auxiliary module unit shown in FIG. 6 with a serially connected secondary auxiliary power source in the form of a pump for hydraulic extraction equipment.

FIGS. 6 and 8 illustrate a preferred packaging module 122 for mounting the hydraulically driven generator of the present invention to a motor vehicle. The illustrations of module 122 in FIGS. 6 and 8 are at opposite orientations.

Typically, there this insufficient space in the vehicle engine compartment or adjacent the vehicle drive train to mount a hydraulic motor and associated generator of the present invention inside the vehicle body. Module 122 is suitable for attachment to the exterior of a vehicle. A large portion of the hydraulically driven generator system can be mounted within module 122. The portion of the system suitable for mounting outside module 122 is illustrated in phantom outline in FIG. 5 by reference number 124. Preferably variable displacement pump 112 and associated pump displacement control 120 will be mounted directly to the power source such as internal combustion engine or a power takeoff associated with an internal combustion engine of the vehicle. Motor 26 and generator 32 are mounted externally in module 122 as are the other components identified in region 124 of FIG. 5.

Module 122 when mounted external to the vehicle not only eliminates space problems but further facilitates dissipating any excess heat generated by pump 112, motor 26, and generator 32 via a fluid cooler 70. Module 122 may be configured to direct cooling air through fluid cooler 70 in an upward or downward direction to provide efficient cooling and to reduce mounting space requirements. Module 122 can be provided with an open grate top 126 (labeled in FIG. 8) which allows air to freely circulate and exhaust through the module and provide a non-slip working surface for the system user. Preferably, module 122 has a cooling fan 72 forcing cooling air about the system components. Module 122 may also include a baffle to separate cooler intake air from mixing with warmer exhausted air. The fluid circuit supply and discharge hydraulic conduits can be disposed to exit the hydraulic system in a generally downward direction in relation to the system mounting orientation to provide reduced mounting space requirements.

Fluid cooler 70 can be disposed within a closed tolerance enclosure 125 also containing cooling fan 72. Tolerance enclosure 125 can generally provide a more even airflow throughout the surface of fluid cooler 70 in order to increase cooler efficiency.

Figure 9:
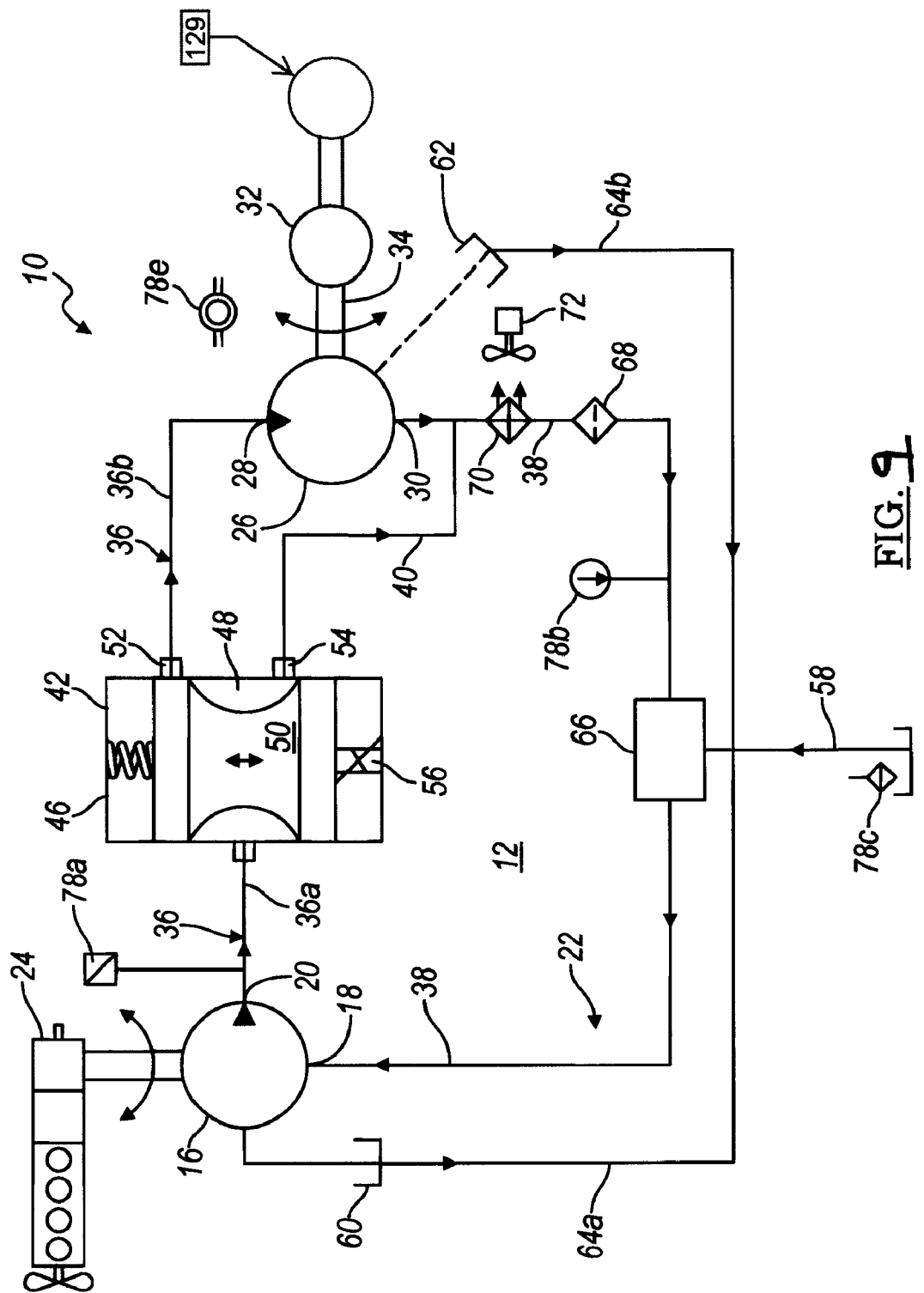
FIG. 9 is a schematic diagram of a fourth alternative embodiment of a hydraulically driven generator and the associated control circuit in accordance with another aspect of the present invention.
Figure 10:
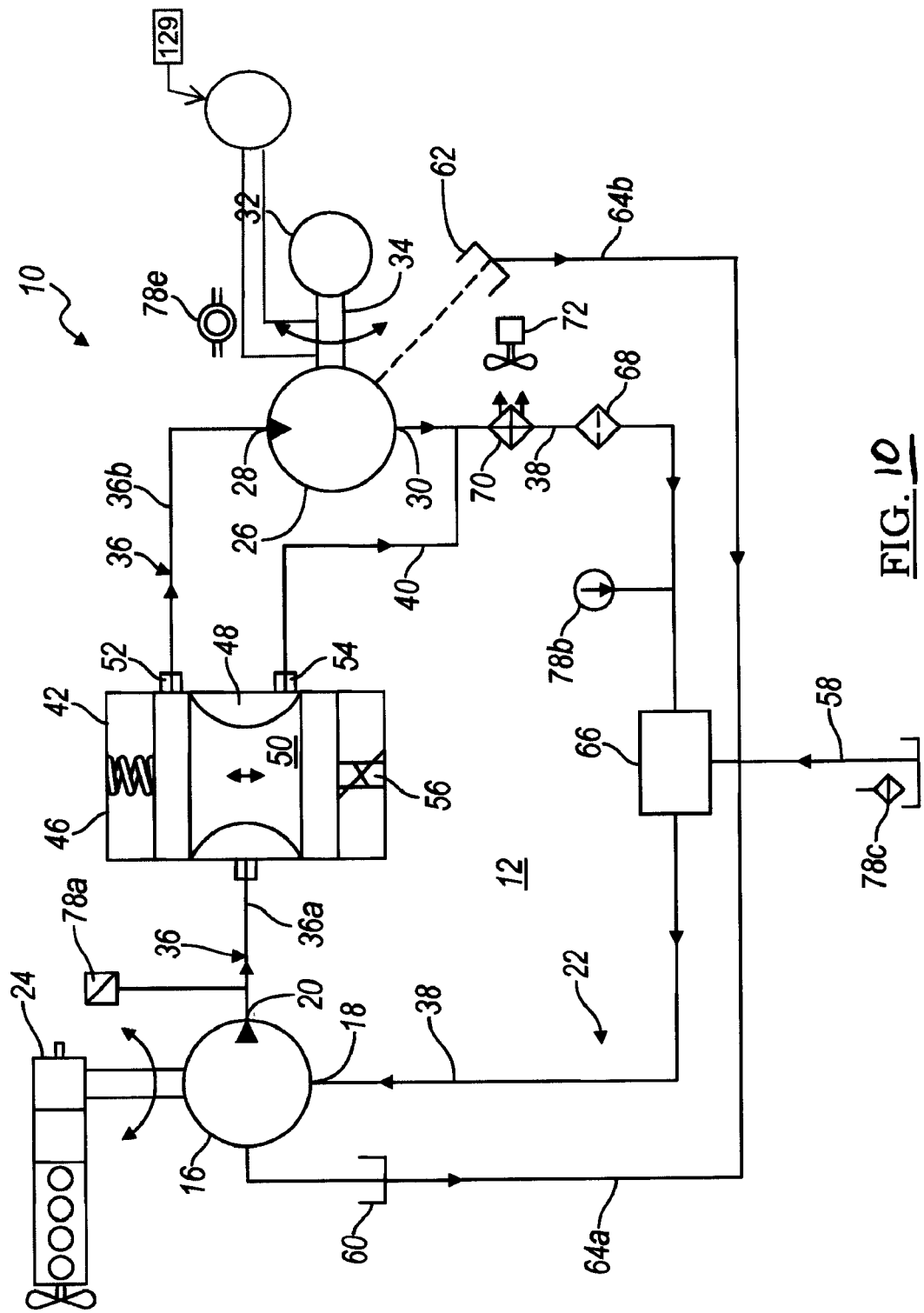
FIG. 10 is a schematic diagram of a fifth alternative embodiment of a hydraulically driven generator and the associated control circuit in accordance with another aspect of the present invention.
Figure 11:
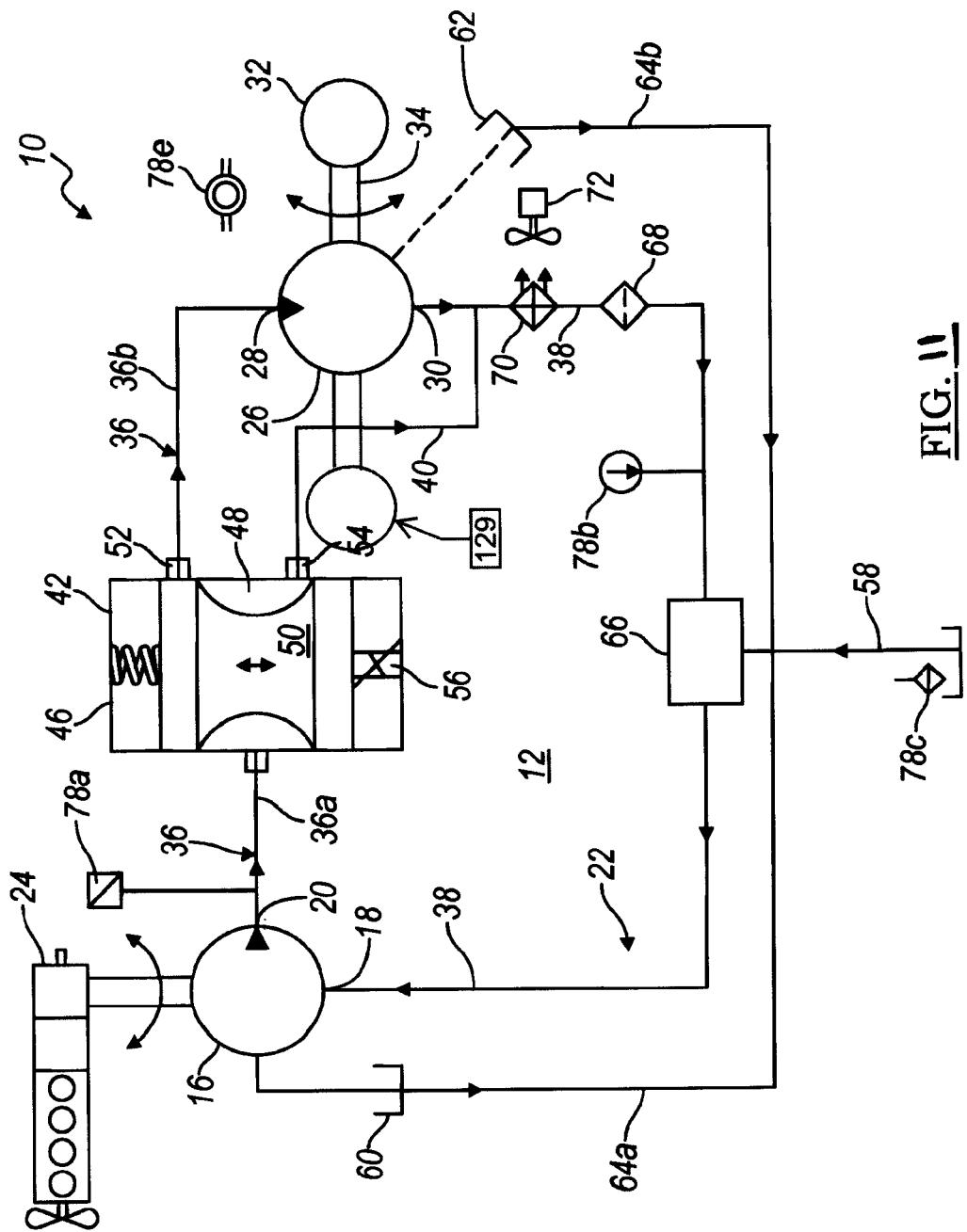
FIG. 11 is a schematic diagram of a sixth alternative embodiment of a hydraulically driven generator and the associated control circuit in accordance with another aspect of the present invention.

As indicated, motor 26 and auxiliary power source 32 (i.e., generator 32) of the hydraulic system are mounted within module 122. As described in further detail below with reference to FIGS. 9, 10, and 11, the hydraulic system may include a secondary auxiliary power source 129. Such a secondary auxiliary power source 129 may be serially connected to auxiliary power source 32 (as shown in FIG. 9), in parallel with auxiliary power source 32 and connected to shaft 34 of motor 26 (as shown in FIG. 10), or serially connected to motor 26 via a shaft separate from shaft 34 (as shown in FIG. 11). For instance, as illustrated in FIG. 8, the hydraulic system mounted within module 122 includes a secondary auxiliary power source 129, in the form of a pump for hydraulic extraction equipment, which is serially connected to auxiliary power source 32 and extends out of module 122.

Figure 7:
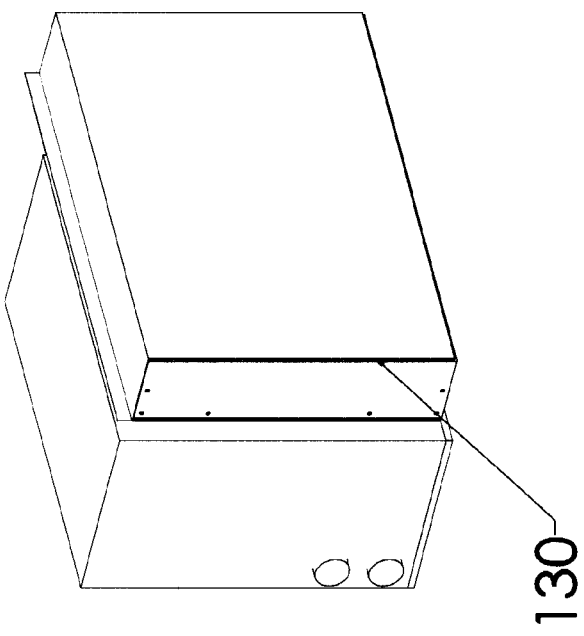
FIG. 7 is an illustration of an auxiliary module unit having a fold-out cooler and being suitable for submersion.
Figure 7:
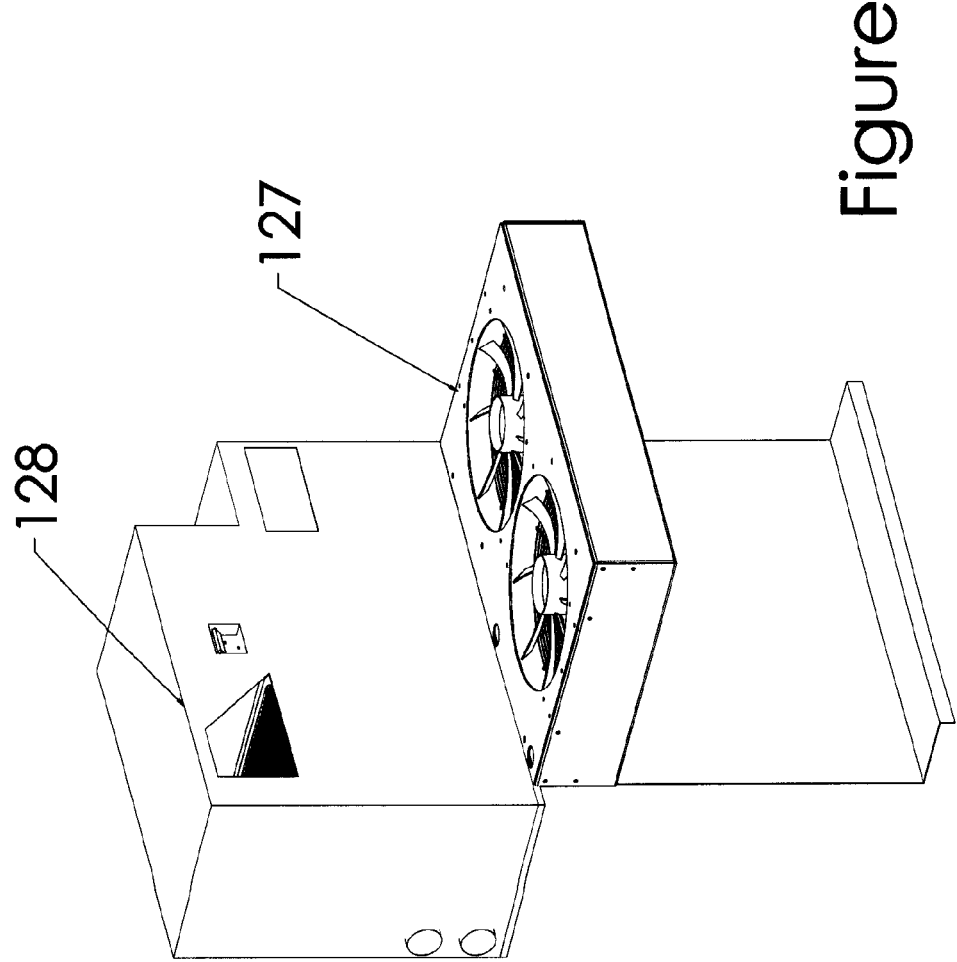

With reference to FIG. 7, a hydraulically driven generator system in accordance with the present invention can be configured with cooler 70 and fan 72 contained together in a cooler/fan assembly 127. Cooler/fan assembly 127 can be positioned to open air when the system is being operated or can be repositioned adjacent to enclosure 128 to create space saving module 130. Repositioning cooler/fan assembly 127 can be accomplished by using hinges, slides, rollers, or any similar method. To increase cooling efficiency, an auxiliary fan may be positioned within enclosure 128 to ensure proper cooling of auxiliary power source 32. In addition, a position sensor (not shown) can be added in communication with system controller 44 wherein the position of cooler 70 can be determined in that if cooler 70 is in the storage position the system will not function. Further, a temperature sensor may be disposed on or near auxiliary power source 32 and be in electrical communication with system controller 44. System controller 44 may contain an electrical sub-circuit to monitor the temperature and shut down the system if predetermined unsafe conditions exist.

Enclosure 128 may contain interlocks in communication with system controller 44 to determine if electrical connections are exposed to an operator or if cooler/fan assembly 127 is folded out and unsafe for travel. Enclosure 128 can be capable of withstanding water immersion for use with various requirements of vehicles the system may be installed on.

A hydraulic control system in accordance with the present invention may have other features. For instance, system controller 44 may control a voltage regulator for auxiliary power source 32 using the output of the auxiliary power source or another source of AC or DC power. The system may output multiple types of power simultaneously, such as AC and DC power or 60 Hz AC power and 400 Hz AC power. It is to be understood that there are many combinations of power possible and the combinations listed are merely exemplary. Auxiliary power source 32 can be any device requiring or preferring more environmental protection than can be offered where primary power source 24 is located. In the case of a typical engine driven vehicle, the power available is located under the vehicle at the Power Take Off (PTO). Under vehicle locations are subject to wear, dirt, and salt.

Referring now to FIGS. 9, 10, and 11, with continual reference to FIG. 1, fourth, fifth, and sixth embodiments of the present invention are illustrated. A hydraulically driven generator system 10 shown in each of FIGS. 9, 10, and 11 is the same as system 10 described with reference to FIG. 1 with the exception that a secondary auxiliary power source 129 is employed in addition to auxiliary power source 32. That is, system 10 has the ability to include two or more auxiliary power sources. The auxiliary power sources can be coupled together serially or in parallel. In FIG. 9, a secondary auxiliary power source 129 is serially connected to auxiliary power source 32. In FIG. 10, a secondary auxiliary power source 129 is in parallel with auxiliary power source 32 and is connected to shaft 34 of motor 26. In FIG. 11, a secondary auxiliary power source 129 is serially connected to motor 26 via a shaft separate from shaft 34. The auxiliary power sources may be drivably connected to a clutch or other connection and disconnection apparatus to independently control functionality. Further, if one or more auxiliary power sources requires a different rotational speed, then they may be drivably connected to an under-drive or over-drive device such as a gear box, a belt drive, or a chain system.

Figure 12:
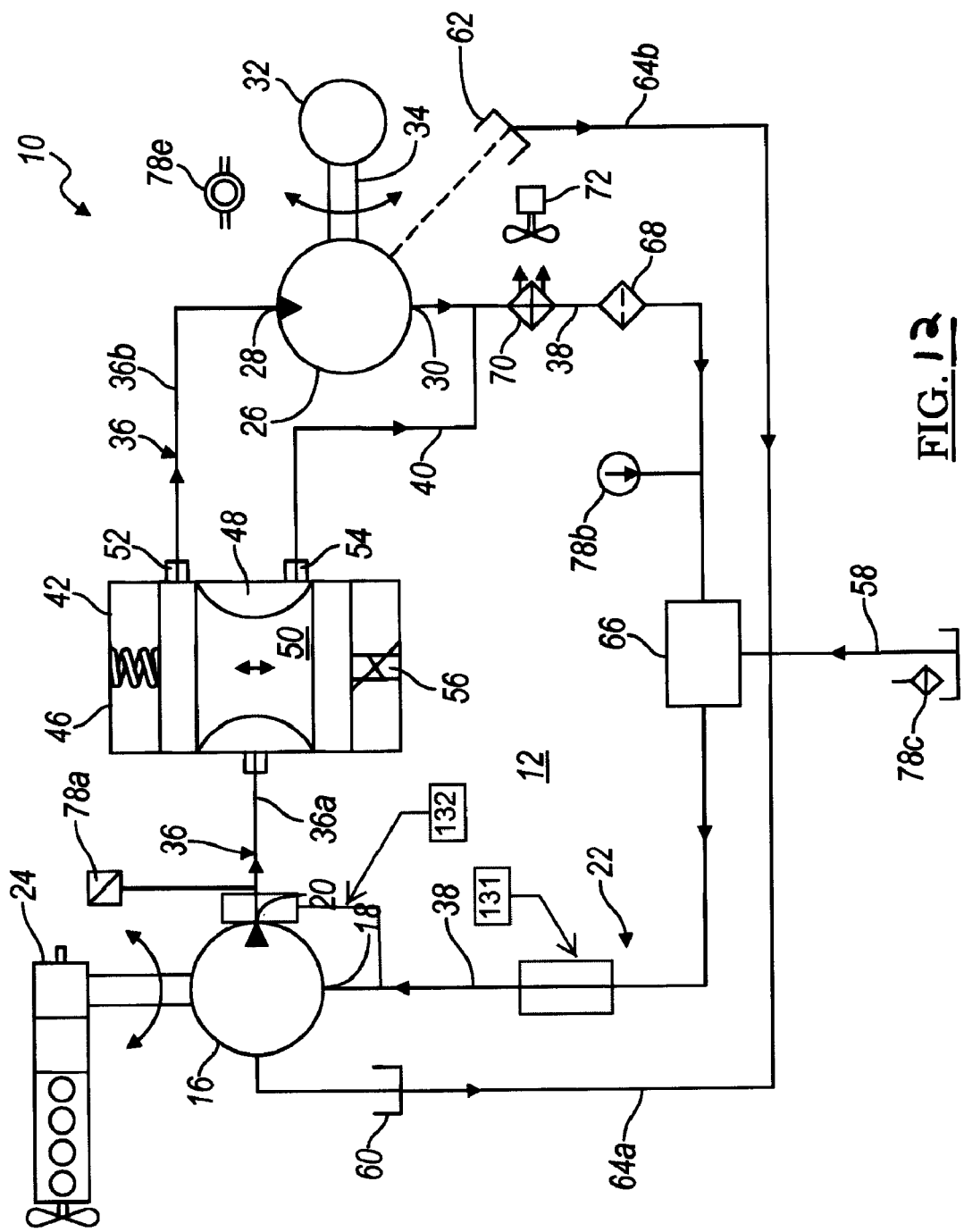
FIG. 12 is a schematic diagram of a seventh alternative embodiment of a hydraulically driven generator and the associated control circuit in accordance with another aspect of the present invention.

Referring now to FIG. 12, with continual reference to FIG. 1, a seventh embodiment of the present invention is illustrated. A hydraulically driven generator system 10 shown in FIG. 12 is the same as system 10 described with reference to FIG. 1 with the exception that one or more additional control valve assemblies 131, 132 are employed. For instance, system 10 may include a control valve assembly 132 disposed serially and/or parallel with respect to supply conduit 36 such that it is interposed between outlet 20 of pump 16 and control valve assembly 42. Control valve assembly 132 may be employed to warm and/or isolate and protect the rest of system 10 from conditions existing at pump 16 such as cold hydraulic fluid. Control valve assembly 132 may be slowly opened to allow fluid to propagate to the rest of system 10 as conditions improve such as the hydraulic fluid warming to an appropriate temperature.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A hydraulic system comprising:
a variable displacement hydraulic pump drivably connectable to a primary power source, the pump having an inlet for receiving fluid, an outlet for discharging fluid under pressure, and a pump displacement input;
a hydraulic motor having an inlet for receiving fluid under pressure and an outlet for discharging spent fluid;
a fluid circuit including a supply conduit for conducting fluid discharged by the pump to the motor and a return conduit for returning fluid discharged by the motor to the pump;
a pump displacement control cooperating with the pump displacement input in order to vary the displacement of the pump; and
a control circuit in communication with the pump displacement control for controlling the pump output such that the motor is driven at a constant rotational speed to thereby drive an auxiliary power source drivably connected to the motor at a constant rotational speed despite fluctuations in rotational speed of the primary power source.

2. The system of claim 1 wherein:
wherein the fluid circuit further includes a hydraulic fluid cooler disposed serially with respect to the return conduit, an electrically operated fan disposed adjacent the fluid cooler to pass ambient air through the fluid cooler, and a thermostat disposed proximate to the fluid cooler to operate the fan when fluid contained within the fluid cooler attains temperatures exceeding a predetermined temperature.

3. The system of claim 2 wherein:
the fluid circuit further includes a hydraulic fluid filter disposed serially with respect to the return conduit;
wherein the system further comprises a housing enclosing the motor, the fluid cooler, and the fluid filter, wherein the housing is readily installable to a chassis of a vehicle.

4. The system of claim 3 wherein:
the fluid cooler and the fan are disposed in an orientation such to direct exhausted air upward.

5. The system of claim 3 wherein:
the fluid cooler and the fan are disposed in an orientation such to direct exhausted air downward.

6. The system of claim 3 wherein:
the housing comprises a tolerance enclosure interposed between the fluid cooler and the fan for providing a generally evenly distribution of airflow through the fluid cooler.

7. The system of claim 1 wherein:
the auxiliary power source is a generator.

8. The system of claim 1 wherein:
the control circuit comprises a pressure sensor for determining sufficient hydraulic pressure for system operation, wherein the control circuit causes system operation to begin when hydraulic pressure is sufficient and causes system operation to shut down when hydraulic pressure is deficient.

9. The system of claim 8 wherein:
the control circuit further comprises a pressure sensor for determining system overpressure, wherein the control circuit causes system operation to shutdown to prevent damage in the event of system overpressure.

10. The system of claim 1 further comprising:
an interface module having a display in electrical communication with the control circuit for displaying real time system operating characteristics to an operator.

11. The system of claim 10 further comprising:
diagnostic memory that records abnormal operating conditions and faults for subsequent retrieval by an operator through the interface module.

12. The system of 10 wherein:
the interface module displays fault and alarm conditions.

13. The system of claim 1 wherein:
the fluid circuit further includes a fluid reservoir;
wherein the control circuit comprises a fluid level sensor disposed in the fluid reservoir for generating a fluid level fault when the fluid level falls below a first minimum fluid level and for generating a control signal shutting down the system when the fluid level falls below a second minimum level.

14. The system of claim 1 wherein:
the pump is operable to drive another device in addition to the motor.

15. The system of claim 1 further comprising:
at least one of a converter and an inverter in electrical communication with the auxiliary power source to create multiple types of auxiliary power.

16. The system of claim 15 further comprising:
a frequency selection switch that mechanically engages contacts for switching between the multiple types of auxiliary power.

17. The system of claim 15 further comprising:
an electronic frequency selection switch in electric communication with the control circuit to engage contacts for switching between the multiple types of auxiliary power.

18. The system of claim 15 further comprising:
a voltage selection switch that mechanically engages contacts for switching between the multiple types of auxiliary power.

19. The system of claim 15 further comprising:
an electronic voltage selection switch in electric communication with the control circuit to engage contacts for switching between the multiple types of auxiliary power.

20. The system of claim 15 further comprising:
a switch allowing variable output of the multiple types of auxiliary mulitple.

21. The system of claim 1 wherein:
the fluid circuit further comprises a fluid reservoir and a venturi boost for drawing fluid from the fluid reservoir into the fluid circuit.

22. The system of claim 1 wherein:
the fluid circuit further comprises a fluid reservoir and a charge pump for drawing fluid from the fluid reservoir into the fluid circuit.

23. The system of claim 1 wherein:
the fluid circuit further comprises a hydraulic fluid filter disposed serially with respect to the return conduit.

24. The system of claim 1 wherein:
the auxiliary power source is one of a pump, a pump for a pressurized foaming system for fire suppression, a hydraulic pump for extraction tools, an air pump refilling tanks for breathing apparatus, or a DC generator.

25. The system of claim 1 wherein the auxiliary power source is a first auxiliary power source, the system further comprising:
a second auxiliary power mechanically coupled to the first auxiliary power source in a serial arrangement.

26. The system of claim 25 further comprising:
a clutch configured to enable or disable the second auxiliary power source.

27. The system of claim 1 wherein the auxiliary power source is a first auxiliary power source, the system further comprising:
a second auxiliary power source hydraulically coupled to the first auxiliary power source.

28. The system of claim 27 further comprising:
a valve configured to enable or disable the second auxiliary power source.

29. The system of claim 1 further comprising:
a heater disposed in thermal communication with the fluid to aid in cold operation and startup.

30. The system of claim 1 further comprising:
air filters to protect the auxiliary power source from foreign contamination.

31. The system of claim 30 further comprising:
a sensor electrically coupled with the control circuit to sense when the air filter is contaminated and needs replacing.

32. The system of claim 1 wherein:
the control circuit is electrically coupled to the primary power source in order to disconnect the pump from the primary power source or turn off the primary power source.

33. The system of claim 1 further comprising:
a remote tripable breaker or other appropriate contacts electrically coupled to the control circuit to disconnect the output of the auxiliary power source.

34. The system of claim 1 wherein the auxiliary power source is a generator, wherein the control circuit comprises:
an electrical output sensor coupled to the generator for determining output voltage of the generator;
a reference signal generator for generating a reference signal indicative of a predetermined output voltage; and
a comparing sub-circuit for comparing sensed output voltage with the reference signal and for generating a control signal controlling the pump output such that the supply of fluid conducted to the motor is sufficient for the generator to maintain desired output voltage.

35. The system of claim 1 wherein:
the control circuit is in communication with a vehicle data bus.

36. The system of claim 1 further comprising:
a control panel in communication with the control circuit via the vehicle data bus in order to control the system and receive information regarding operation of the system.

37. The system of claim 1 wherein the auxiliary power source is a generator, the system further comprising:
an auxiliary fan to provide air flow to the generator.

38. The system of claim 1 wherein:
the control circuit includes a temperature sensor disposed proximate the auxiliary power source for sensing temperature of the auxiliary power source.

39. The system of claim 1 further comprising:
a sensor in communication with the control circuit and operable to determine if the output of the auxiliary power source is exposed or unsafe.

40. The system of claim 1 further comprising:
an enclosure suitable for water immersion allowing the system to be disposed in otherwise unsuitable locations when not in use.

41. The system of claim 1 wherein:

the auxiliary power source is a generator;

wherein the system further includes a generator voltage regulator in communication with the control circuit and the generator;

wherein the control circuit controls the generator voltage regulator to control output of the auxiliary power source.

42. The system of claim 41 wherein:

the regulator is directly powered by the output of the generator.

43. The system of claim 41 wherein:

the regulator is directly powered by the primary power source.

44. The system of claim 1 wherein:

the auxiliary power source is a device requiring more environmental protection than environmental protection required by the primary power source.

45. The system of claim 1 wherein the auxiliary power source is a first auxiliary power source, the system further comprising:

a second auxiliary power source;

wherein the first and second auxiliary power sources are both drivably connectable to the motor.

46. The system of claim 45 further comprising:

at least one clutch configured with the motor and the first and second auxiliary power sources to disable or enable one or more the first and second auxiliary power sources.

47. The system of claim 1 wherein the auxiliary power source is a first auxiliary power source to be driven at a first constant rotational speed, the system further comprising:

a second auxiliary power source to be driven at a second constant rotational speed, wherein the first and second auxiliary power sources are both drivably connectable to the motor via respective gear assemblies configured such that the first and second auxiliary power sources are driven by the motor at their respective constant rotational speeds when the motor is driven at a constant rotational speed.

* * * * *